(12) United States Patent
Terada et al.

(10) Patent No.: US 6,355,590 B1
(45) Date of Patent: Mar. 12, 2002

(54) CATALYST FOR PURIFICATION OF EXHAUST GAS

(75) Inventors: Kazuhide Terada; Naohiro Satoh; Yoshiyuki Nakanishi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/234,417

(22) Filed: Jan. 21, 1999

(30) Foreign Application Priority Data

Jan. 21, 1998 (JP) .......................................... 10-009800

(51) Int. Cl.$^7$ .......................... B01J 29/87; B01J 23/10; B01J 23/42
(52) U.S. Cl. ............................. 502/61; 502/73; 502/74; 502/77; 502/64; 502/304
(58) Field of Search .............................. 502/61, 64, 73, 502/74, 77, 304; 423/239.2

(56) References Cited

U.S. PATENT DOCUMENTS

| | | | |
|---|---|---|---|
| 5,306,684 A | * | 4/1994 | Itoh et al. ..................... 502/61 |
| 5,804,526 A | * | 9/1998 | Satoh et al. ................. 502/304 |
| 5,916,839 A | * | 6/1999 | Pak et al. .................... 502/328 |
| 5,945,369 A | * | 8/1999 | Kimura et al. .............. 502/304 |

FOREIGN PATENT DOCUMENTS

| JP | A 8-131838 | 5/1996 |
|---|---|---|

* cited by examiner

*Primary Examiner*—Steven P. Griffin
*Assistant Examiner*—Christina Ildebrando
(74) *Attorney, Agent, or Firm*—Birch, Stewart, Kolasch & Birch, LLP

(57) ABSTRACT

A catalyst for purifying exhaust gas is disclosed which can attain a high percentage of NO purification in an oxygen-excess atmosphere even after exposure to a hydrothermal environment. The catalyst for purifying exhaust gas comprises a combination of a carrier having platinum deposited thereon and $CeO_2$ having an average crystallite diameter D satisfying $D \geq 13.0$ nm. The carrier is made of a gallosilicate having an $SiO_2/Ga_2O_3$ molar ratio M satisfying $100 \leq M \leq 1,230$.

9 Claims, 2 Drawing Sheets

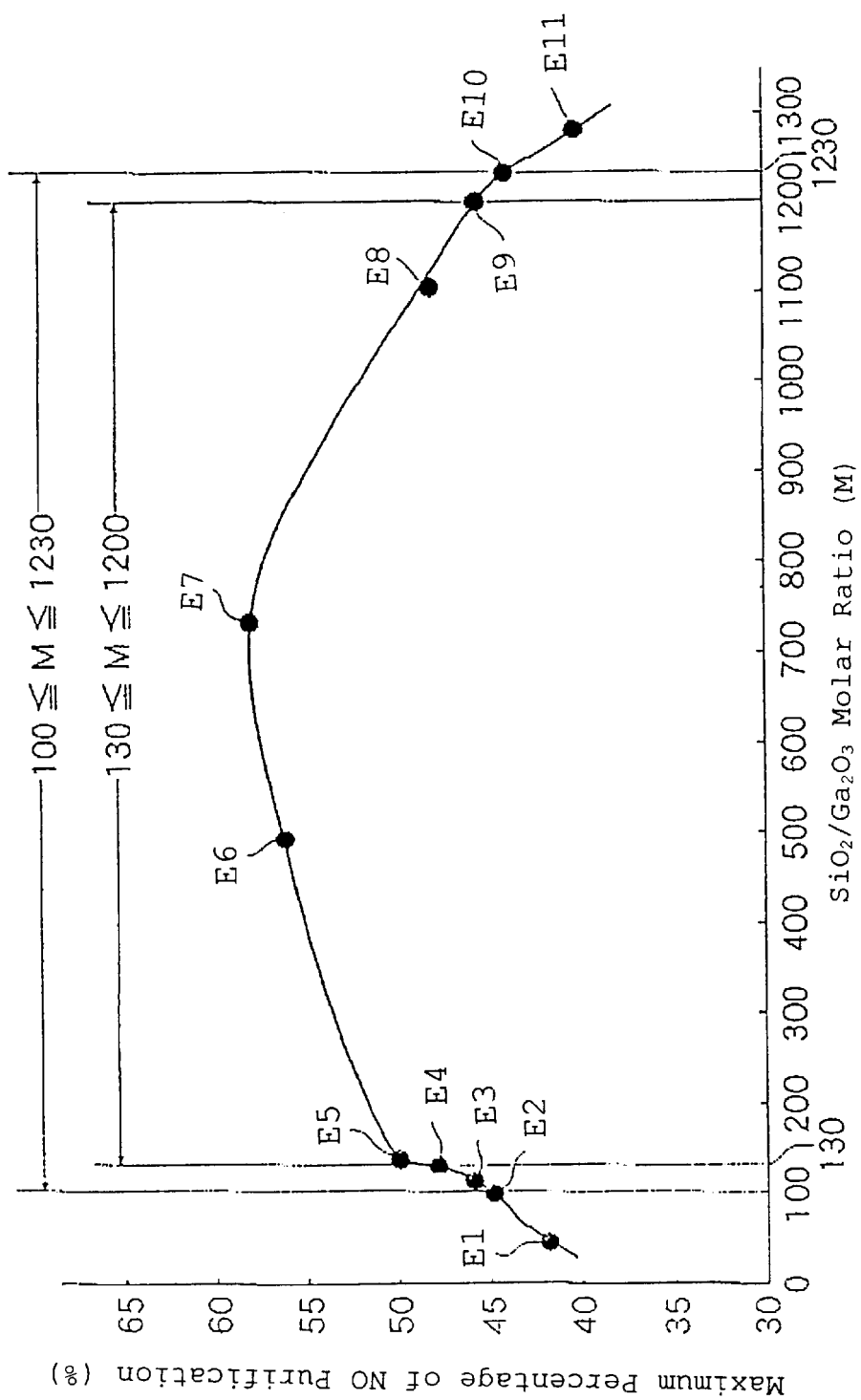

CATALYST FOR PURIFICATION OF EXHAUST GAS

FIELD OF THE INVENTION

The present invention relates to a catalyst for purifying exhaust gas.

BACKGROUND OF THE INVENTION

A catalyst for purifying exhaust gas comprising a combination of a zeolite having platinum deposited thereon and $CeO_2$ is proposed in JP-A-8-131838 as a catalyst improved in the ability to purify $NO_x$ (nitrogen oxides) (the term "JP-A" as used herein means an "unexamined published Japanese patent application"). The platinum in the above catalyst functions as a catalyst metal and has the ability to oxidize and reduce the exhaust gas. The oxidizing ability of the platinum contributes to oxidation reactions such as HC (hydrocarbon)+$O_2 \rightarrow H_2O+CO_2$ and $CO+O_2 \rightarrow CO_2$. At a theoretical air/fuel ratio, the platinum adsorbs NO and the reducing ability thereof contributes to reduction reactions such as $NO \rightarrow N_2$. In oxygen-excess atmospheres, the platinum contributes to oxidation reactions such as $NO+O_2 \rightarrow NO_2$ and reduction reactions such as $NO_2+HC+O_2 \rightarrow N_2+CO_2+H_2O$.

The zeolite functions to adsorb HC in the exhaust gas and feed the concentrated HC to the platinum. Thus, the percentage of $NO_x$ purification in oxygen-excess atmospheres can be heightened. $CeO_2$ has the ability to adsorb $NO_x$ in oxygen-excess atmospheres to thereby heighten the concentration of $NO_x$ around the platinum. This also can bring about an improvement in the percentage of $No_x$ purification in oxygen-excess atmospheres. $CeO_2$ further has the effect of inhibiting the thermal deterioration of the catalyst.

The present inventors made various investigations on the catalyst described above. As a result, they have concluded that the above-described catalyst, upon exposure to a high-temperature environment containing oxygen and steam, i.e., a hydrothermal environment, deteriorates in the ability to purify $NO_x$ in oxygen-excess atmospheres, and this is attributable to the poor durability of the zeolite in the hydrothermal environment.

The catalyst described above shows the relatively satisfactory ability to purify $NO_x$ when the temperature of the exhaust gas, i.e., gas temperature, is low, specifically, in the range of from 150 to 300° C. However, in a high-gas-temperature range above 300° C., the catalyst shows the property of releasing $NO_x$.

The reasons for the above phenomenon are thought to be as follows. The purification of $NO_x$ in the low-temperature range is based on the mechanism of adsorption of $NO_x$ and reduction of the $NO_x$. Consequently, when the amount of adsorbed $NO_x$ is larger than the amount of reduced $NO_x$, the $NO_x$ remaining unreduced is occluded by the catalyst. This occluded $NO_x$ is released in that high-temperature range.

As a result of the release of occluded $NO_x$ in the high-temperature range, the exhaust gas comes to contain the released $NO_x$ besides the $NO_x$ originally generated by engine running. In addition, the amount of the $NO_x$ thus released is not constant. Because of these, there has been a problem that the control of $NO_x$ purification is difficult.

SUMMARY OF THE INVENTION

An object of the present invention is to provide a catalyst for purifying exhaust gas which can retain the high ability to purify $NO_x$ in oxygen-excess atmospheres even after exposure to a hydrothermal environment such as that described above and does not release $NO_x$ in the high-temperature range.

In order to accomplish the above object, the present invention provides a catalyst for purifying exhaust gas which comprises a combination of a carrier having platinum deposited thereon and $CeO_2$ having an average crystallite diameter (D) satisfying $D \geq 13.0$ nm, the carrier being made of a gallosilicate having an $SiO_2/Ga_2O_3$ molar ratio (M) satisfying $100 \leq M \leq 1,230$.

BRIEF DESCRIPTION OF THE DRAWINGS

FIG. 2 is a graph showing the relationship between $SiO_2/Ga_2O_3$ molar ratio and the maximum percentage of NO purification.

DETAILED DESCRIPTION OF THE INVENTION

Figure 1:
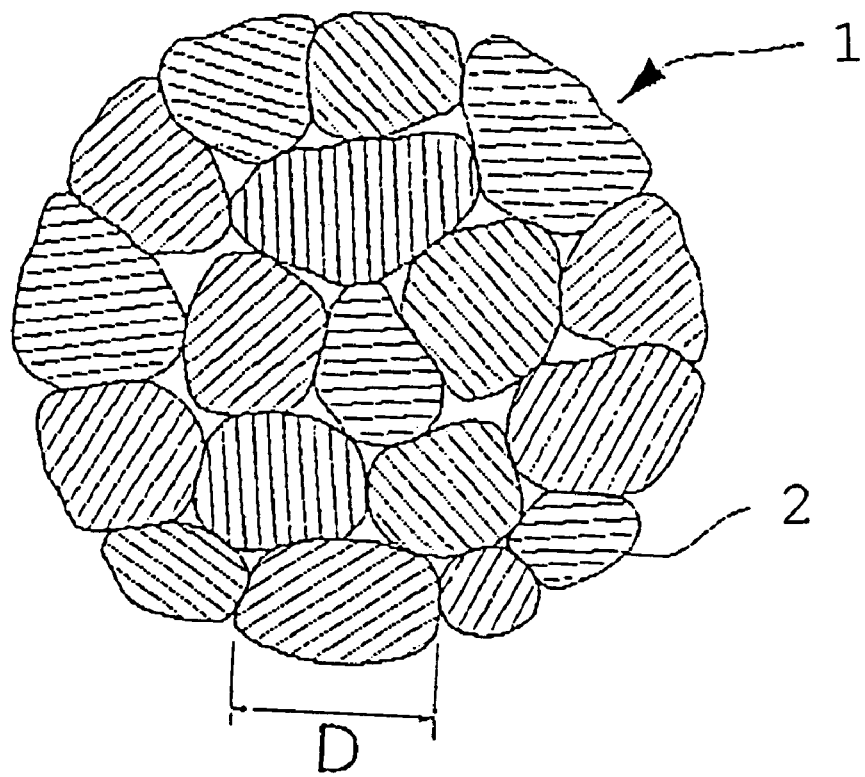
FIG. 1 is a view illustrating $CeO_2$.

The term "gallosilicate" ($Ga_2O_3 \cdot SiO_2 \cdot nH_2O$) means a substance having a structure which is formed by replacing framework aluminum atoms of a zeolite with gallium atoms and in which the amount of residual aluminum is on a level of unavoidable impurities. By subjecting such a gallosilicate to a treatment for gallium removal, a gallosilicate having a molar ratio M within the above-specified range, i.e., a modified gallosilicate, can be obtained.

In this catalyst, the platinum functions as a catalyst metal and has the ability to oxidize and reduce the exhaust gas, as in the prior art catalyst described hereinabove. The $CeO_2$ has the ability to adsorb $NO_x$ in oxygen-excess atmospheres, as in the prior art catalyst. In this case, the adsorption amount of $NO_x$ correlates with the average crystallite diameter D of the $CeO_2$. When $CeO_2$ having an average crystalline diameter D satisfying $D \geq 13.0$ nm is used, then the adsorbed $NO_x$ can be almost completely cleaned up although the adsorption amount of $NO_x$ is smaller than that in the case of using $CeO_2$ in which $D<13.0$ nm. Thus, occlusion of $NO_x$ can be avoided.

Furthermore, the gallosilicate having a molar ratio M within the range specified above not only functions to adsorb HC in the exhaust gas and feed the concentrated HC to the platinum, but also shows excellent durability in the hydrothermal environment described above. The gallosilicate hence brings about the following effects: (1) troubles such as platinum burying due to pore clogging can be avoided; and (2) the gallium is effectively inhibited from being removed from the framework, whereby the deterioration of $CeO_2$ in function caused by released gallium can also be avoided.

Consequently, this catalyst retains the high ability to purify $NO_x$ in oxygen-excess atmospheres even after exposure to the above-described hydrothermal environment, and does not release $NO_x$ in a high-gas-temperature range.

However, if the molar ratio M is below 100, the gallium amount is too large and the framework structure hence has a large strain, resulting in reduced thermal stability of the gallosilicate. On the other hand, if M exceeds 1,230, the gallium amount is too small and this gallosilicate is similar to $SiO_2$ in properties and hence has reduced thermal stability.

The catalyst for purifying exhaust gas comprises both a carrier having platinum deposited thereon as a catalyst metal and $CeO_2$ having an average crystallite diameter D satisfying $D<13.0$ nm. The carrier is made of a gallosilicate having an $SiO_2/Ga_2O_3$ molar ratio M satisfying $100 \leq M \leq 1,230$, preferably $130 \leq M \leq 1,200$.

The content of the gallosilicate having platinum deposited thereon and the deposition amount of platinum in this platinum-supporting gallosilicate are respectively the same as the content of the zeolite having platinum deposited thereon and the deposition amount of platinum in this platinum-supporting zeolite (for details, see JP-A-8-131838). Specifically, the content of the platinum-supporting gallosilicate Pt—Ga is regulated to 19 wt %<Pt—Ga<100 wt % (based on the total amount of the platinum-supporting gallosilicate Pt—Ga and $CeO_2$), while the deposition amount of platinum in the platinum-supporting gallosilicate Pt—Ga is regulated to 3.5 wt %<Pt<11 wt % (based on the total amount of platinum and gallosilicate). If the content of the platinum-supporting gallosilicate Pt—Ga is 19 wt % or lower, the HC-adsorbing ability of the platinum-supporting gallosilicate is reduced, resulting in a reduced percentage of $NO_x$ (mainly NO) purification. On the other hand, if the content of the Pt—Ga is 100 wt %, not only the $NO_x$-adsorbing ability of $CeO_2$ is not obtained, resulting in a reduced percentage of $NO_x$ purification, but also the $CeO_2$'s effect of inhibiting thermal deterioration is not obtained, resulting in reduced heat resistance of the catalyst. If the deposition amount of platinum is 3.5 wt % or smaller, a reduced percentage of $NO_x$ purification results because of the too small platinum amount. On the other hand, even if the deposition amount of platinum is increased to 11 wt % or larger, the percentage of $NO_x$ purification changes little.

The platinum-supporting gallosilicate is produced by depositing platinum on a gallosilicate by the ion-exchange method, vacuum deposition method (PVD), impregnation method, etc. In this case, use of the vacuum deposition method is effective in improving the percentage of $NO_x$ purification because the method enables platinum to be deposited on the gallosilicate surface and thus brings about satisfactory contact between the platinum and the exhaust gas.

This gallosilicate, which is of the type MFI, may be an unmodified one, as long as it has a $SiO_2/Ga_2O_3$ molar ratio M satisfying $100 \leq M \leq 1,230$. However, a modified gallosilicate obtained by subjecting an unmodified gallosilicate to a treatment for gallium removal is desirable from the standpoint of heat resistance in the high-temperature exhaust gas during engine running.

As the treatment for removing gallium from an unmodified gallosilicate, at least one of acid treatment, steam treatment, and boiling-water treatment can be used.

The acid treatment can be conducted by a method which comprises heating a 0.5 to 10N HCl solution to 70 to 90° C., adding an unmodified gallosilicate to the HCl solution, and stirring the mixture for from 1 to 25 hours.

The boiling-water treatment can be conducted by a method which comprises impregnating an unmodified gallosilicate with water, heating the atmosphere surrounding the water-impregnated unmodified gallosilicate to 550 to 600° C., and holding the unmodified gallosilicate in the high-temperature atmosphere for about 4 hours.

Furthermore, the steam treatment can be conducted by a method which comprises holding an unmodified gallosilicate in an atmosphere having a moisture content of about 10% and a temperature of from 750 to 900° C. for from 10 to 20 hours.

These acid treatment, boiling-water treatment, and steam treatment are employed alone or in combination of two or more thereof as the gallium-removing treatment, and may be repeated if desired and necessary. As a result, a modified gallosilicate having an $SiO_2/Ga_2O_3$ molar ratio M falling within the range of $100 \leq M \leq 1,230$, preferably $130 \leq M \leq 1,200$, can be obtained. Such a modified gallosilicate has a heat resistance temperature of about 1,000C.

The platinum, functioning as a catalyst metal, has the ability to oxidize and reduce the exhaust gas. The oxidizing ability of the platinum contributes to oxidation reactions such as $HC+O_2 \rightarrow H_2O+CO_2$ and $CO+O_2 \rightarrow CO_2$. At a theoretical air/fuel ratio, the platinum adsorbs NO and the reducing ability thereof contributes to reduction reactions such as $NO \rightarrow N_2$. In oxygen-excess atmospheres, the platinum contributes to oxidation reactions such as $NO+O_2 \rightarrow NO_2$ and reduction reactions such as $NO_2+HC+O_2 \rightarrow N_2+CO_2+H_2O$.

The modified gallosilicate has enhanced hydrophobicity due to the treatment for gallium removal. In addition, as the modified gallosilicate retains the basic framework structure possessed by the unmodified gallosilicate, the removal of gallium increases the specific surface area, thereby enhancing the adsorbing ability characteristic of the gallosilicate. This modified gallosilicate satisfactorily adsorbs HC in the exhaust gas even in the presence of moisture to feed concentrated HC to the platinum, and shows excellent durability in a hydrothermal environment. Thus, the percentage of $NO_x$ purification in an oxygen-excess atmosphere can be heightened.

As shown in FIG. 1, $CeO_2$ 1 is in the form of polycrystalline particles which each is an aggregate of crystallites 2. The average crystallite diameter D of the $CeO_2$ is regulated to $D \geq 13.0$ nm. The control of average crystallite diameter D is accomplished by heating $CeO_2$ having a given average crystalline diameter D in the air. Through this heating, the average crystalline diameter D of the $CeO_2$ increases.

For calculating a crystallite diameter $D_{(hkl)}$, use was made of the Scherrer equation, i.e., $D_{(hkl)} = 0.9\lambda/(\beta_{1/2} \cdot \cos \theta)$, wherein hkl are Miller indices, $\lambda$ is the wavelength (Å) of characteristic X-rays, $\beta_{1/2}$ is the half-value width (rad.) of the (hkl) plane, and $\theta$ is the angle of X-ray reflection. Consequently, in $CeO_2$, the $D_{(111)}$ of each crystallite was calculated from the half-value width $\beta_{1/2}$ for the (111) plane determined from an X-ray diffraction pattern, and the average crystallite diameter D was determined therefrom.

Since the $CeO_2$ has the ability to adsorb $NO_x$ in oxygen-excess atmospheres, the concentration of $NO_x$ around the platinum is heightened. This also can bring about an improvement in the percentage of $NO_x$ purification in oxygen-excess atmospheres.

EXAMPLES

Specific examples of the catalyst according to the present invention will be given below.

(I) Production of Modified Gallosilicates (a) An unmodified gallosilicate having an $SiO_2/Ga_2O_3$ molar ratio of 40 was subjected to a modification treatment comprising placing the gallosilicate in a 1N HCl solution having a temperature of 90° C. and stirring the resultant mixture for 3 hours. Thus, a slurry was obtained.

(b) The solid matter was separated from the slurry by filtration, and then washed with pure water until the pH of the washing water became 4 or higher.

(c) The solid matter was dried in the air under the conditions of 130° C. and 5 hours. Subsequently, the dried solid matter was calcined in the air at 400° C. for 12 hours to obtain a modified gallosilicate in the form of agglomerates.

(d) The modified gallosilicate agglomerates were pulverized to obtain a powder-form modified gallosilicate. This modified gallosilicate had an $SiO_2/Ga_2O_3$ molar ratio of 108, showing that gallium removal had occurred. The modified gallosilicate had a heat resistance temperature of 1,000° C.

Subsequently, various powder-form modified gallosilicates were obtained in the same manner as the above, except that the conditions for the modification treatment were changed. Table 1 shows the modification treatment conditions for each of modified gallosilicate examples 1 to 11 and the silicon content, gallium content, sodium content, and $SiO_2/Ga_2O_3$ molar ratio M of each example. The unmodified gallosilicate and the modified gallosilicate shown above firstly are given in Table 1 as "Unmodified" and "Example 3", respectively.

TABLE 1

| Modified Gallo-Silicate | Modification Treatment | Si Content (wt %) | Ga Content (wt %) | Na Content (wt %) | $SiO_2/Ga_2O_3$ Molar Ratio, M |
|---|---|---|---|---|---|
| Unmodified | | 40.3 | 5.7 | 0.68 | 35 |
| Example 1 | 0.1 N HCl 3 h | 42.1 | 4.6 | 0.06 | 44 |
| Example 2 | 1 N HCl 2 h | 43.5 | 2.2 | <0.02 | 100 |
| Example 3 | 1 N HCl 3 h | 43.6 | 2.0 | <0.02 | 108 |
| Example 4 | 1 N HCl 5 h | 44.0 | 1.7 | <0.02 | 130 |
| Example 5 | 1 N HCl 15 h | 43.8 | 1.6 | <0.02 | 136 |
| Example 6 | 5 N HCl 5 h | 43.9 | 0.4 | <0.02 | 495 |
| Example 7 | 5 N HCl 15 h | 44.5 | 0.3 | <0.02 | 736 |
| Example 8 | 10 N HCl 15 h | 44.4 | 0.2 | <0.02 | 1102 |
| Example 9 | 10 N HCl 20 h | 44.3 | 0.2 | <0.02 | 1200 |
| Example 10 | 10 N HCl 25 h | 44.4 | 0.2 | <0.02 | 1230 |
| Example 11 | 10 N HCl 30 h | 44.4 | 0.2 | <0.02 | 1280 |

(II) Production of Platinum-supporting Gallosilicates Pt—Ga (a) Twenty-five grams of dinitrodiammineplatinum was dissolved in 1,000 ml of 25% ammonia water with heating to obtain a platinum solution (platinum concentration, 1.5 wt %).

(b) To 533 g of the platinum solution was added 92 g of gallosilicate example 1. This mixture was placed in an evaporator, and the solution was evaporated to dryness. Thus, platinum-supporting gallosilicate example 1 was obtained which consisted of the modified gallosilicate and platinum deposited thereon.

(c) The example 1 was dried in the air under the conditions of 130° C. and 1 hour. Subsequently, the dried example 1 was calcined in the air at 400° C. for 12 hours. The example 1 thus treated had a platinum deposition amount of 8.0 wt %.

Subsequently, platinum-supporting gallosilicate examples 2 to 11 were obtained using modified gallosilicate examples 2 to 11 by the same method as the above. These examples 2 to 11 thus obtained each had the same platinum deposition amount as the example 1.

(III) Production of $CeO_2$

Commercially available $CeO_2$ having an average crystallite diameter D of 7.8 nm was heated in the air at 700° C. for 3 hours. The average crystallite diameter D of the $CeO_2$ after heating was 13.3 nm.

(IV) Production of Catalysts

Into a pot were introduced 30 g of platinum-supporting gallosilicate example 1, 60 g of the $CeO_2$, 50 g of a 20 wt % silica sol, and 180 g of pure water together with alumina balls having a diameter of 5 mm. Wet grinding was conducted for 12 hours to prepare a slurry. In the first catalyst to be produced from this slurry, the content of the platinum-supporting gallosilicate was about 33 wt %, while that of the $CeO_2$ was about 67 wt %.

In this slurry was immersed a honeycomb made of 6-mil cordierite and having a diameter of 25.4 mm, a length of 60 mm, and a cell density of 400 cells per square inch. Subsequently, the honeycomb was taken out from the slurry and the excess slurry was removed with an air jet. Thereafter, the honeycomb 2 was held at 150° C. for 1 hour to dry the adherent slurry and then calcined in the air under the conditions of 400° C. and 12 hours to deposit a solid matter on the honeycomb. In this honeycomb, the deposition amount of the solid matter, i.e., a layer comprising the catalyst and silica derived from silica sol, was 200 g/l. This structure is referred to as catalyst example 1.

Subsequently, catalyst examples 2 to 11 were obtained using platinum-supporting gallosilicate examples 2 to 11 by the same method as the above. In each of these examples 2 to 11, the honeycomb had the same deposition amount as in the example 1.

(V) Aging

Catalyst examples 1 to 11 were aged. In order to obtain a hydrothermal environment, this aging was conducted using a tubular oven filled with an atmosphere consisting of 10 vol % $O_2$, 10 vol % $H_2O$, and $N_2$ as the remainder, under the conditions of a temperature of 700° C. and a heating time of 20 hours.

(VI) Purifying Test with Pseud Exhaust Gas

Table 2 shows the composition of a test gas prepared so as to be similar to an exhaust gas.

TABLE 2

| Test Gas (corresponding to A/F = 22) | |
|---|---|
| Component | Content (vol %) |
| $O_2$ | 8.0 |
| $CO_2$ | 10.3 |
| $C_3H_6$ | 0.28 |
| CO | 0.09 |
| NO | 0.03 |
| $H_2$ | 0.03 |
| $H_2O$ | 10.0 |
| $N_2$ | Remainder |

First, catalyst example 1 which had been aged was disposed in a fixed-bed reactor of the flow system type. Subsequently, the test gas whose composition is shown in Table 2 was passed through the reactor at a space velocity S.V. of $5 \times 10^4$ $h^{-1}$ while elevating the temperature of the test gas from room temperature at a rate of 20° C./min. At given gas temperatures, the percentage of NO purification was measured. The same test was conducted on catalyst examples 2 to 11 which had undergone the aging.

Table 3 shows the $SiO_2/Ga_2O_3$ molar ratio M and the maximum percentage of NO purification for each of the examples 1 to 11 and the gas temperature at which the maximum value was obtained. FIG. 2 shows a graph obtained from data given in Table 3 and showing the relationship between $SiO_2/Ga_2O_3$ molar ratio M and the maximum percentage of NO purification. E1 to E11 correspond to the data of Examples 1 to 11, respectively.

TABLE 3

| Catalyst | $SiO_2/Ga_2O_3$ Molar Ratio, M | Maximum Percentage of NO Purification Value (%) | Gas Temperature (° C.) |
|---|---|---|---|
| Example 1 | 44 | 42 | 240 |
| Example 2 | 100 | 45 | 240 |
| Example 3 | 108 | 46 | 230 |
| Example 4 | 130 | 48 | 230 |
| Example 5 | 136 | 50 | 220 |
| Example 6 | 495 | 56 | 220 |
| Example 7 | 736 | 58 | 220 |
| Example 8 | 1102 | 48 | 240 |
| Example 9 | 1200 | 47 | 240 |
| Example 10 | 1230 | 43 | 250 |
| Example 11 | 1280 | 40 | 250 |

As apparent from Table 3 and FIG. 2, the examples 2 to 10, in which the $SiO_2/Ga_2O_3$ molar ratio M had been regulated to $100 \leq M \leq 1,230$, each had a maximum percentage of NO purification as high as 43% or higher after the aging. Furthermore, regulating that molar ratio M to $130 \leq M \leq 1,200$ heightened the maximum percentage of NO purification to 47% or higher as in the examples 4 to 9.

A comparative catalyst example was produced using a platinum-supporting zeolite having an $SiO_2/Al_2O_3$ molar ratio of 300 (i.e., a modified zeolite ZSM-5) in place of the platinum-supporting gallosilicates in the above-described catalysts. This comparative example was aged in the same manner as the above and then subjected to the same purifying test as the above. As a result, the maximum percentage of NO purification thereof was 42%, and the gas temperature at which the maximum value was obtained was 260° C.

In the case where $CeO_2$ having an average crystallite diameter D of 8.7 nm was used, for example, in catalyst example 2, $NO_x$ release was observed at gas temperatures not lower than 330° C.

According to the present invention, a catalyst for purifying exhaust gas can be provided which, due to the constitution described above, retains the high ability to purify $NO_x$ in oxygen-excess atmospheres even after exposure to a hydrothermal environment and does not release $NO_x$ in a high-gas-temperature range.

While the invention has been described in detail and with reference to specific embodiments thereof, it will be apparent to one skilled in the art that various changes and modifications can be made therein without departing from the spirit and scope thereof.

What is claimed is:

1. A catalyst for purifying exhaust gas, which comprises a carrier having platinum deposited thereon and $CeO_2$ having an average crystallite diameter (D) satisfying $D \geq 13.0$ nm, said carrier being made of a gallosillicate having an $SiO_2/Ga_2O_3$ molar ratio (M) satisfying $495 \leq M \leq 1,230$.

2. The catalyst of claim 1, wherein the content of the carrier having platinum deposited thereon is more than 19% by weight and less than 100% by weight, based on the total amount of the platinum-supporting gallosilicate and the $CeO_2$.

3. The catalyst of claim 1, wherein the carrier has platinum deposited thereon in an amount of more than 3.5% and less than 11% by weight, based on the total amount of the platinum and gallosilicate.

4. A catalyst for purifying exhaust gas, which comprises a carrier having platinum deposited thereon and $CeO_2$ having an average crystallite diameter (D) satisfying $D \geq 13.0$ nm, said carrier being made of a gallosillicate having an $SiO_2/Ga_2O_3$ molar ratio (M) satisfying $100 \leq M \leq 1,230$, said gallosillicate having a heat resistance temperature of approximately 1,000° C.

5. The catalyst of claim 4, wherein the content of the carrier having platinum deposited thereon is more than 19% by weight and less than 100% by weight, based on the total amount of the platinum-supporting gallosilicate and the $CeO_2$.

6. The catalyst of claim 4, wherein the carrier has platinum deposited thereon in an amount of more than 3.5% and less than 11% by weight, based on the total amount of the platinum and gallosilicate.

7. The catalyst of claim 4, said carrier being made of a gallosillicate having an $SiO_2/Ga_2O_3$ molar ratio (M) satisfying $130 \leq M \leq 1,200$.

8. The catalyst of claim 4, said carrier being made of a gallosillicate having an $SiO_2/Ga_2O_3$ molar ratio (M) satisfying $200 \leq M \leq 1,200$.

9. The catalyst of claim 4, said carrier being made of a gallosillicate having an $SiO_2/Ga_2O_3$ molar ratio (M) satisfying $495 \leq M \leq 1,230$.

* * * * *